Jan. 12, 1943.　　W. L. AVRETT, JR　　2,307,980
TRACTOR PLOW
Filed May 9, 1941　　3 Sheets-Sheet 1

Inventor
WALTER LEE AVRETT, JR
By Clarence A. O'Brien
Attorney

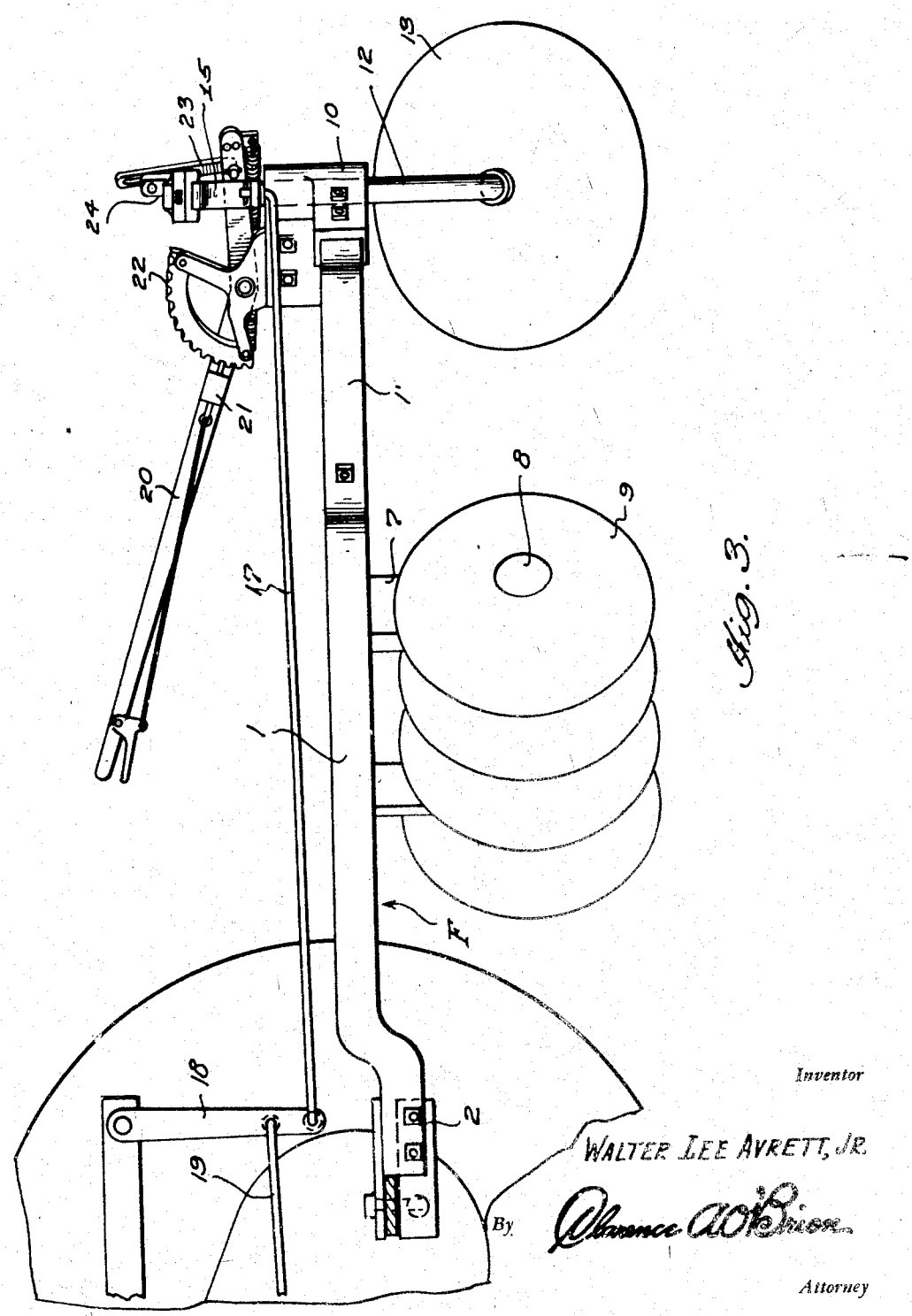

Patented Jan. 12, 1943

2,307,980

UNITED STATES PATENT OFFICE 2,307,980

TRACTOR PLOW

Walter Lee Avrett, Jr., Davisboro, Ga.

Application May 9, 1941, Serial No. 392,769

1 Claim. (Cl. 97—47)

This invention relates to a tractor plow, the general object of the invention being to provide a frame connected with the draw bar of a tractor and extending rearwardly and supporting a plurality of plows and a furrow wheel with means for causing the wheel to be given a steering movement by the steering mechanism of the tractor so that the attachment will follow the tractor in its turning movement.

Another object of the invention is to provide means for adjusting the frame to raise and lower the plow.

This invention also consists in certain other features of construction and in the combination and arrangement of the several parts to be hereinafter fully described, illustrated in the accompanying drawings and specifically pointed out in the appended claim.

In describing the invention in detail, reference will be had to the accompanying drawings wherein like characters denote like or corresponding parts throughout the several views, and in which:

Figure 3 is an elevational view with parts in section.

Figure 1:
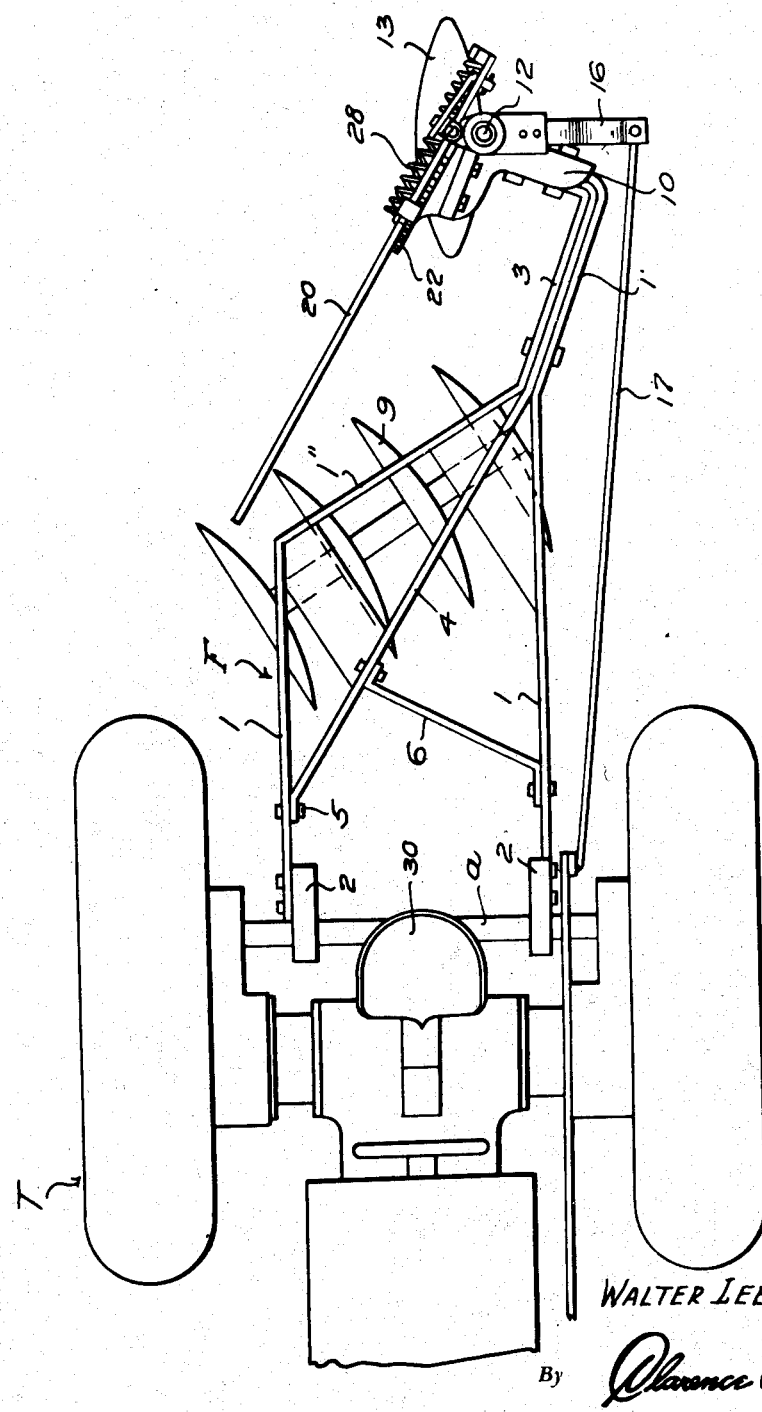
Figure 1 is a top plan view showing the invention applied to a tractor, only a portion of the tractor being shown.
Figure 2:
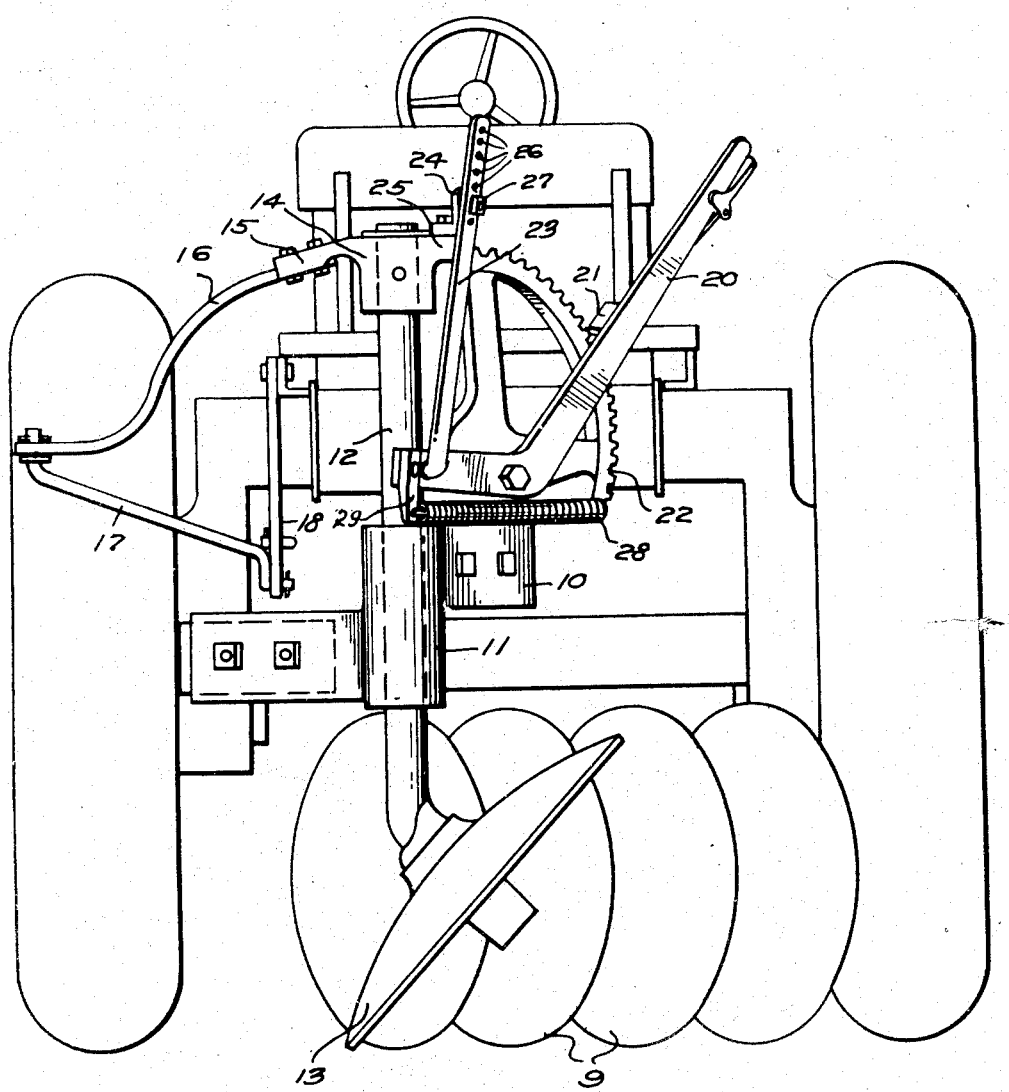
Figure 2 is a rear view of Figure 1.

In these views the letter T indicates a tractor which is provided with the rotary draw bar $a$ at its rear and in carrying out the invention a frame F is provided which is composed of the parallel bars 1 which at the front are fastened to the draw bar as shown at 2. One of the bars 1 extends at an angle rearwardly and toward the left of the tractor as shown at 1'. The other bar is formed with a long angularly arranged part 1" which terminates in a part 3 which parallels the part 1' and a brace bar 4 forms part of the frame and has a part located between the parts 1' and 3 with the front portion of the bar 4 extending through the space between the two bars 1 and connected with the right bar 1 adjacent its front end as shown at 5. A second brace bar 6 connects the front part of the bar 4 with the left bar 1. This frame is provided with hangers 7 which support the shaft 8 which carries the disks 9, the shaft being substantially parallel to the part 1" of the right bar 1. At the rear end the three bars turn at right angles and are connected to a casting 10 which carries a substantially vertically arranged bearing member 11 of tubular shape for the spindle or shaft 12, the lower end of which is bent at an angle to support the furrow wheel 13 at an incline or angle. The shaft 12 can be partly rotated to adjust the position of the wheel 13 by having a collar 14 attached to its upper end which is provided with an arm 15 to which a link 16 is connected and a rod 17 connects the part 16 with a depending lever 18 on a part of the tractor and this lever being connected by a link 19 with the steering mechanism of the tractor. Thus the wheel 13 is caused to turn in a steering movement in accordance with the steering of the tractor so that the attachment will follow the tractor in its turning movement.

The frame can be raised and lowered to raise and lower the plows or disks through means of a hand lever 20 having a detent 21 operating over a toothed segment 22 fastened to the member 10 with a link 23 connecting the lower end of the lever to an angle bracket 24 pivoted to an arm 25 on the collar 14 and which is arranged opposite the arm 15. The link 23 is provided with a plurality of holes 26 for selectively receiving the bolt 27 which connects the link with the bracket 24 and the lower end of the link 23 can be adjustably connected with the lower end of the lever 20. A spring 28 connects the lower end of the segment 22 with a depending part 29 on the lower end of the lever, this spring helping the operator to raise and lower the frame or part 10 by the lever.

The connection of bracket 24 with the arm 25 and with the link 23 and the connection of the link 23 with the lower part of the hand lever 20 are all loose enough so that these parts will not interfere with the partial rotary movement of the shaft 12 in the steering action, and said shaft is slidable in the bearing member 11 to compensate for arcuate throw of the link 23.

The lever 20 is made long enough so that it can be reached by an operator on the seat 30 of the tractor.

Thus it will be seen that I have provided a frame which can be easily and quickly attached to the rear part of the tractor and which carries a plurality of disks with a furrow wheel at the rear end of the tractor provided with means for automatically adjusting the same by the operation of the steering means of the tractor and with manually operated means for raising and lowering the rear end of the frame to raise and lower the disks.

One of the main purposes of the invention is to permit the driver of the tractor to control the plow at any desired time while the tractor and plow is in motion.

It is thought from the foregoing description that the advantages and novel features of the invention will be readily apparent.

It is to be understood that changes may be made in the construction and in the combination and arrangement of the several parts provided that such changes fall within the scope of the appended claim.

Having described the invention, what is claimed as new is:

An attachment for a tractor comprising a frame including a pair of bars having parallel front ends, means for connecting said front ends to the rear part of the tractor, said bars having angle portions adjacent the rear ends which extend rearwardly and toward one side of the tractor, a brace bar connected with the front end of one of the first-mentioned bars with its rear end passing between the rear ends of the said bars and fastened thereto, all three bars having an angle rear end, a casting connected with the rear end, a substantially vertically arranged post journaled in the casting and having a bent end, a furrow wheel carried by said bent end, means for connecting the post to the steering mechanism of the tractor and manually operated means for moving the rear end of the casting on the post for raising and lowering the frame, said means including an arm extending from the post, a lever pivoted to a rear part of the tractor, a link connecting the lever to the arm and means for connecting the lever to the steering mechanism of the tractor.

WALTER LEE AVRETT, JR.